United States Patent [19]
Nishikubo et al.

[11] Patent Number: 4,549,818
[45] Date of Patent: Oct. 29, 1985

[54] TEMPERATURE DETECTOR

[75] Inventors: Yasuhiko Nishikubo; Toyoharu Fujikawa; Tsutomu Tanaka, all of Tokorozawa, Japan

[73] Assignee: Citizen Watch Co., Ltd., Tokyo, Japan

[21] Appl. No.: 557,469

[22] Filed: Dec. 2, 1983

[30] Foreign Application Priority Data

Dec. 10, 1982 [JP] Japan ................................ 57-217417

[51] Int. Cl.$^4$ ............................................. G01K 7/00
[52] U.S. Cl. .................................... 374/178; 374/183
[58] Field of Search ............... 374/178, 183, 185, 170; 331/66, 57, 186, 108 C; 307/310; 323/313, 314, 315, 316

[56] References Cited

U.S. PATENT DOCUMENTS

| | | | |
|---|---|---|---|
| 3,617,859 | 11/1971 | Dobkin et al. | 323/313 |
| 3,904,988 | 9/1975 | Hsiao | 331/108 C |
| 3,978,431 | 8/1976 | Lattin | 331/57 |
| 4,068,134 | 1/1978 | Tobey, Jr. et al. | 323/314 |

FOREIGN PATENT DOCUMENTS

| | | | |
|---|---|---|---|
| 0158286 | 12/1979 | Japan | 374/170 |
| 0207833 | 12/1982 | Japan | 374/170 |

*Primary Examiner*—Charles Frankfort
*Assistant Examiner*—Thomas B. Will
*Attorney, Agent, or Firm*—Birch, Stewart, Kolasch & Birch

[57] ABSTRACT

A temperature detector made by a CMOS integrated circuit. The temperature detector comprises a first constant voltage circuit for producing a first constant voltage, a second constant voltage circuit applied with the first constant voltage for producing a second constant voltage, and a ring oscillator applied with the second constant voltage for producing an output voltage dependent of ambient temperature. Each constant voltage circuit has a standard resistor in the form of a diffusion resistor, a current-mirror circuit as a standard voltage generating circuit, and a voltage follower, and the ring oscillator has a delay resistor formed by a MOS transistor.

3 Claims, 8 Drawing Figures

TEMPERATURE DETECTOR

BACKGROUND OF THE INVENTION

The present invention relates to a temperature detector employing a complementary metal oxide semiconductor ring oscillator made of CMOS integrated circuit as a temperature sensor.

Referring to FIG. 1 showing a conventional system of a temperature detector, the system comprises a CMOS ring oscillator for sensing the ambient temperature, a logic circuit 2 for converting the frequency of the ring oscillator 1 into a temperature data, a display device 3 and a power supply 4.

FIG. 2 shows a circuit of the ring oscillator 1 as a temperature sensor. The frequency of the ring oscillator 1 comprising a plurality of inverters may be expressed by the following formula;

$$f = \tfrac{1}{2}NCR$$

where N is the number of the inverter, C is capacitance and R is resistance of each stage. If the inverter is made of a CMOS, the capacitance C is generally represented by capacitors formed by a substrate, gate oxide and aluminum wires on the gate oxide. The capacitance has very little temperature characteristics. Resistance R is represented by on-state resistance of the MOS transistor and resistance by diffusion. The resistance has a positive temperature coefficient. Accordingly, the ring oscillator frequency f has a negative temperature coefficient.

Referring to FIG. 5 showing frequency-temperature characteristics of the ring oscillator, a line 5a is a line showing a typical value. When supply voltage $V_{DD}-V_{SS}$ is 1.5 V,, the temperature frequency coefficient is about $-0.5\%/°C$. In other words, as seen from FIG. 5, the ratio of change of frequency ($\Delta f$) determined by the variation in output voltage to a specified frequency (f) divided by a temperature in degrees Celcius, yields a temperature-frequency coefficient of $-0.5$ percent per degree Celcius. However, such a conventional system has the following two disadvantages.

First, the ring oscillator frequency f varies with variation of supply voltage. More particulary, on-state resistance of the MOS transistor which affects the resistance R varies with the supply voltage. Therefore, voltage-frequency characteristics of the system are bad.

FIG. 7 shows frequency-voltage characteristics of the ring oscillator. A line 7a is a characteristic of the conventional ring oscillator, which is greatly influenced by decrease of voltage of a battery as voltage supply. Thus, if the ring oscillator is employed for a temperature detector, the variation of the supply voltage causes error in temperature detection, which means inaccuracy of the detector.

Secondly, the temperature-frequency coefficient of the ring oscillator is small. If the temperature coefficient of a ring oscillator frequency f is 0.5%/°C. (for example, when f is 1 KHz), variation of frequency per temperature is 5 Hz/°C. Therefore, the variation rate is too small to improve the accuracy of the detector. However, the frequency f of the ring oscillator cannot be increased in dependence on the necessity of low power consumption of CMOS transistors.

SUMMARY OF THE INVENTION

An object of the present invention is to eliminate the above described disadvantages of a conventional system for detecting temperature.

Another object of the present invention is to provide a ring oscillator for a temperature detector improved so as to have good voltage characteristics and a larger temperature coefficient.

According to the present invention, there is provided a temperature detector made by a CMOS integrated circuit, comprising a first constant voltage circuit for producing a first constant voltage; a second constant voltage circuit applied with said first constant voltage for producing a second constant voltage; and a ring oscillator applied with said second constant voltage for producing an output voltage dependent on ambient temperature.

These and other objects and features of the present invention will become more apparent from the following description with reference to the accompanying drawings.

DESCRIPTION OF THE PREFERRED EMBODIMENTS

Figure 1:
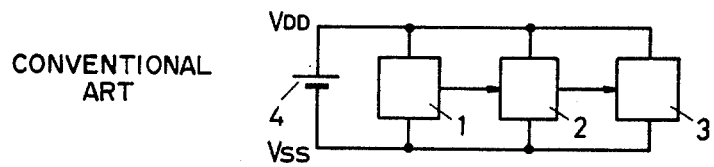
FIG. 1 is a block diagram showing a conventional temperature detector employing a CMOS ring oscillator.
Figure 2:
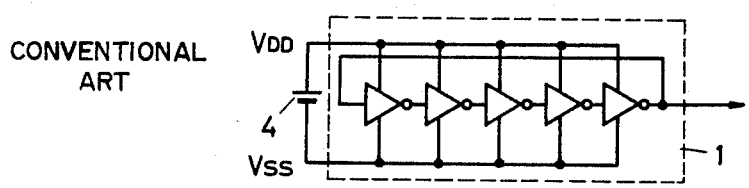
FIG. 2 is a block diagram showing a circuit of a conventional CMOS ring oscillator as a temperature sensor.
Figure 3:
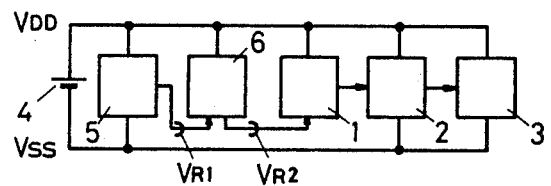
FIG. 3 is a block diagram of a temperature detector employing a CMOS ring oscillator according to the present invention.
Figure 4:
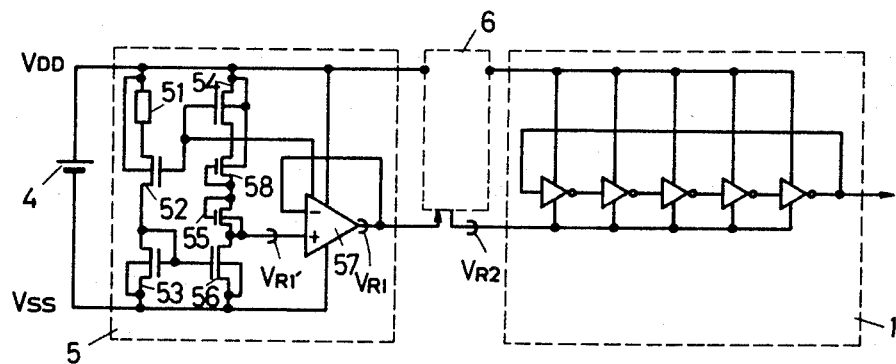
FIG. 4 is a block diagram showing a CMOS ring oscillator employing a double constant voltage supply circuits in accordance with the present invention.
Figure 8:
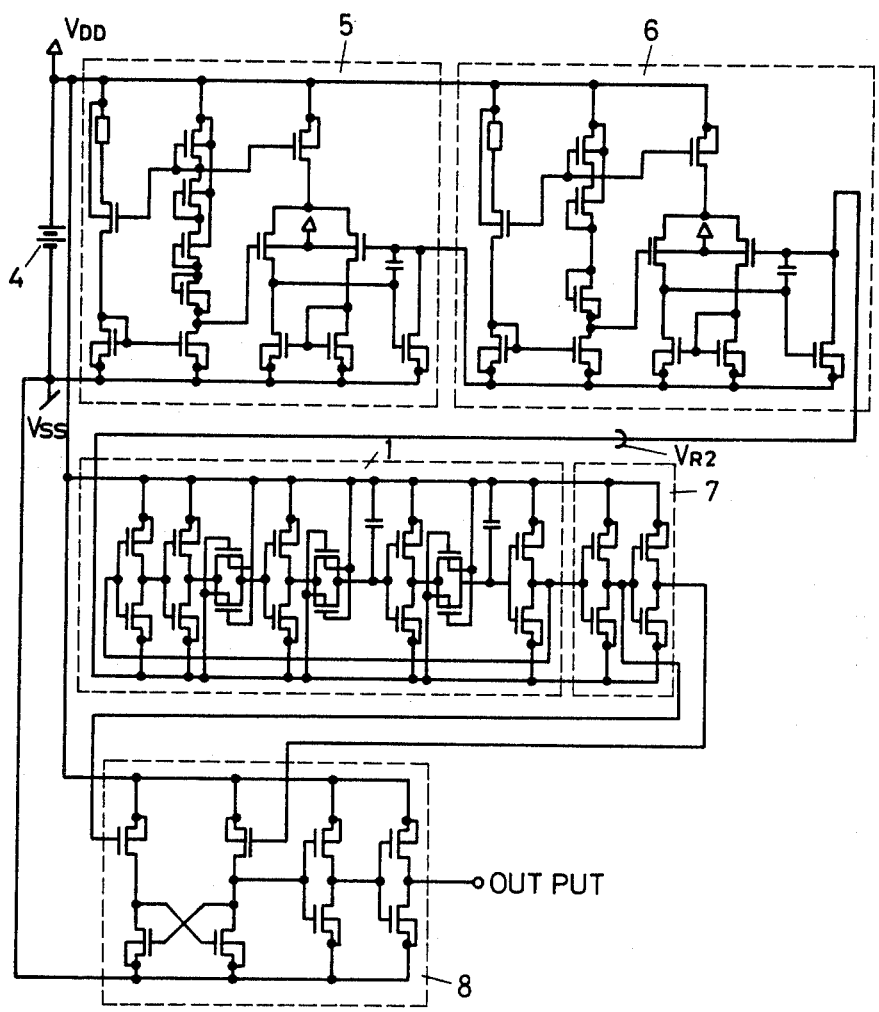
FIG. 8 is an example of a circuit of the ring oscillator according to the present invention.

Referring to FIG. 3, a temperature detector according to the present invention comprises a ring oscillator 1, logic circuit 2, display device 3, a first constant voltage circuit 5, and a second constant voltage circuit 6. The constant voltage circuits are the same in construction and connected in series to supply a constant voltage to the ring oscillator 1. FIG. 4 shows an example of the constant voltage circuit and FIG. 8 shows a circuit provided with a waveform shaping circuit 7, and a level shift output circuit 8.

The structure of the first constant voltage circuit 5 will be hereinafter described. As shown in FIG. 4, the first constant voltage ciricut 5 comprises standard resistor 51 comprising diffused resistance or polysilicon resistance, and a standard voltage generating circuit in the form of a current-mirror circuit. The standard voltage generating circuit comprises p-channel MOS transistors 52, 54, 58 and n-channel MOS transistors 53, 55, 56. The standard voltage $V_{R1}'$ generated by the circuit is applied to a voltage follower 57 to produce a first constant voltage $V_{R1}$. The second constant voltage circuit 6 is applied with the first constant voltage $V_{R1}$ to produce a second constant voltage $V_{R2}$. In order to produce the second constant voltage, the value of standard resistor 51 of the second constant circuit is selected or the MOS transistor 58 for offset-adjusting of the output voltage is short-circuited.

In FIG. 4, the output voltage $V_{R1}$ of the first constant voltage circuit 5 is set nearly equal to 1.4 V and the output voltage $V_{R2}$ of the second constant voltage circuit 6 is set nearly equal to 1.1 V. It is preferable that the difference between the output voltages $V_{R1}$ and $V_{R2}$ is higher than 0.3 V. If the standard resistor 51 is formed by polysilicon or diffusion resistance of 2 to 50 MΩ, current consumption of each constant voltage circuit is less than 10 nA. If the standard resistance 51 is several MΩ, current consumption will increase a little. If the output voltage $V_{R1}$ of the first constant voltage circuit is set to a value slightly lower than a minimum voltage of the power supply 4, variation of the supply voltage is limited below several mV. If the output voltage $V_{R2}$ is set to a value larger than a minimum operative voltage of the ring oscillator circuit, variation of the supply voltage is limited below several tens of $\mu V$, because the voltage $V_{R2}$ is stabilized twice by a double constant voltage circuit. If the supply voltage 4 is a silver battery, $V_{R1}$ is preferably about 1.4 V and $V_{R2}$ is about 1.0 V.

Figure 7:
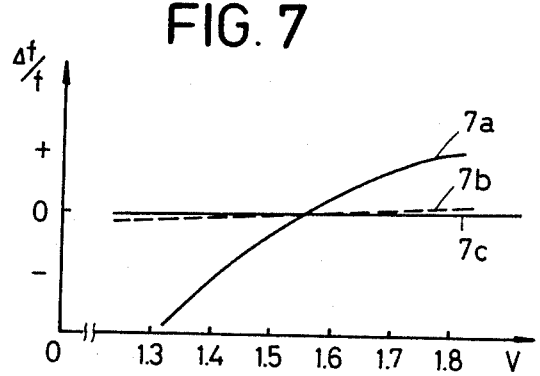
FIG. 7 is a graph showing frequency-voltage characteristics of ring oscillators.

Therefore, the supply voltage $V_{R2}$ for the ring oscillator circuit is securely stabilized by the double constant voltage circuit. A line 7c of FIG. 7 shows voltage-frequency characteristics of the ring oscillator employing the double constant voltage circuit according to the present invention. As seen from the graph, the characteristics are remarkably improved and influence of voltage variation of power supply is eliminated compared with the line 7a which shows conventional characteristics influenced by voltage variation and with a line 7b which shows characteristics employing a single constant voltage circuit. Since the supply voltage is stable, the voltage coefficient of the ring oscillator can be increased, thereby increasing the rate of frequency variation with temperature variation. In such a circuit, it is more effective to employ a MOS transistor as a resistance R for the delay of operation of the ring oscillator.

Figure 6:
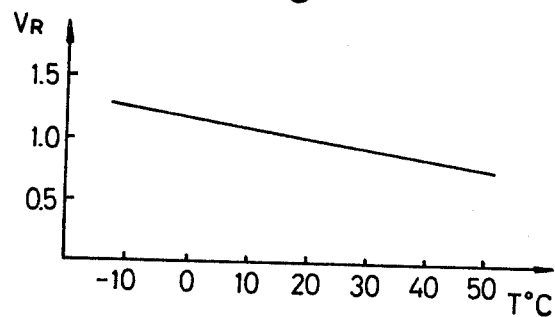
FIG. 6 is a graph showing voltage-temperature characteristics of a constant voltage supply circuit.

FIG. 6 shows temperature-voltage characteristics of the first constant voltage circuit 5. The voltage varies in dependency on the threshold voltage of the MOS transistor and temperature coefficient of standard resistance 51. Therefore, the temperature-voltage coefficient can be changed by selecting a positive or negative temperature coefficient of the standard resistance 51. Generally, the standard resistance has a negative temperature-voltage coefficient as shown in FIG. 6. Accordingly, if P− diffusion resistance is employed for the standard resistance 51, the gradient of the line of temperature-voltage coefficient becomes steep because of positive temperature coefficient of the P− diffusion resistance. If polysilicon resistance is employed, the gradient of the line of temperature-voltage coefficient becomes slight due to the negative temperature coefficient of the resistance. Therefore, in order to increase the gradient of the line with accuracy, P− diffusion resistance is used. The second constant voltage circuit 6 has the same features.

According to the present invention, since two constant voltage circuits each having temperature-voltage coefficients are used, the output voltage $V_{R2}$ has a temperature coefficient larger than the voltage $V_{R1}$. As a result, the frequency f of the ring oscillator is greatly changed.

Figure 5:
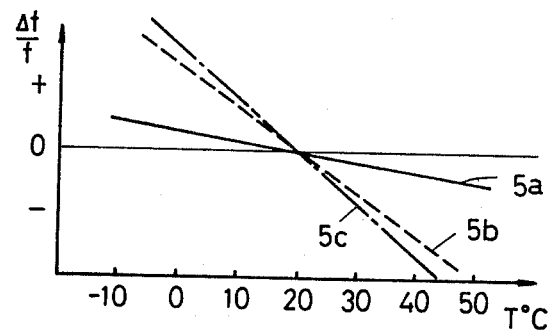
FIG. 5 is a graph showing frequency-temperature/-characteristics of a conventional ring oscillator and a ring oscillator according to the present invention.

A line 5c of FIG. 5 shows a temperature coefficient of the detector according to the present invention, which is ten times as large as a conventional one. A line 5b shows a temperature coefficient employing a single constant voltage circuit.

From the foregoing, it will be understood that the present invention provides an improved temperature detector which has voltage stability and high temperature detection sensitivity.

The output of the voltage $V_{R2}$ may be used for a direct analogue output as temperature data.

What is claimed is:

1. A temperature detector made by a CMOS integrated circuit, comprising:
   first constant voltage circuit means for producing a first constant voltage;
   second constant voltage circuit means, connected to said first constant voltage circuit means, applied in series with said first constant voltage for producing a second constant voltage; and
   ring oscillator means, connected to said first constant voltage circuit means, applied in series with said second constant voltage for producing an output voltage dependent on ambient temperature.

2. The temperature detector according to claim 1 wherein each of said first and second constant voltage circuit means has a standard resistor in the form of diffusion resistor, the difference between said first and second constant voltages being higher than 0.3 V.

3. The temperature detector according to claim 1 wherein each of said first and second constant voltage circuit means comprises a current-mirror circuit as a standard voltage generating circuit, and a voltage follower.

* * * * *